June 2, 1942.   J. P. NIELSON   2,284,919
HAYSTACK SAW
Filed March 26, 1941
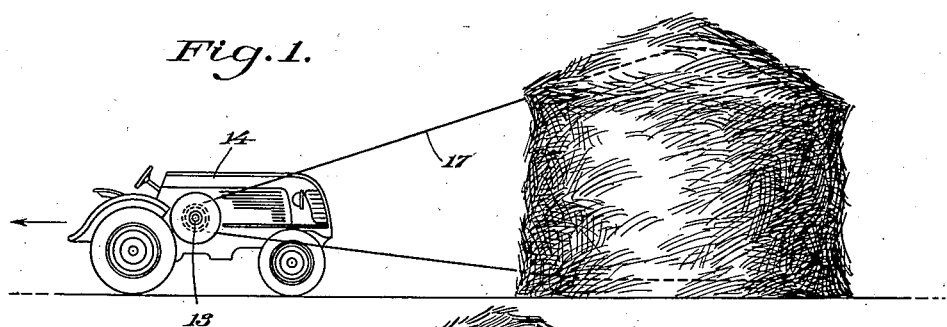
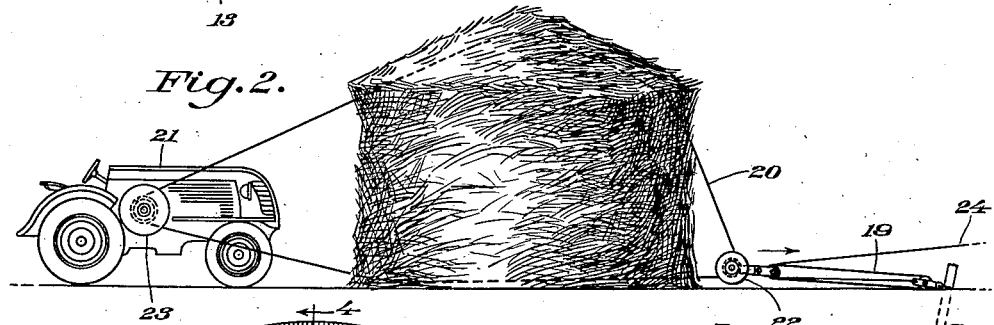
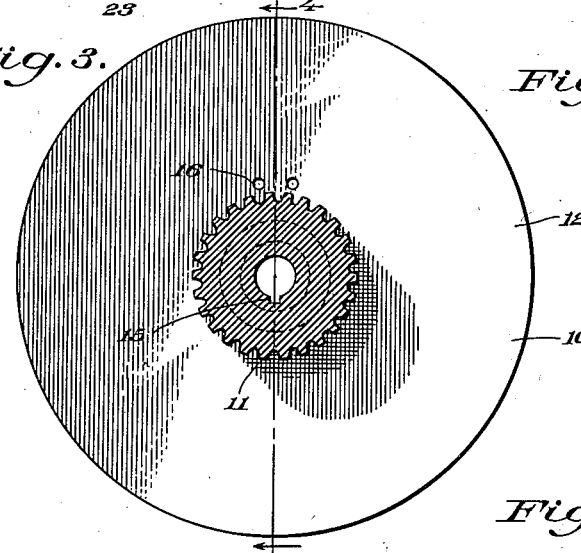
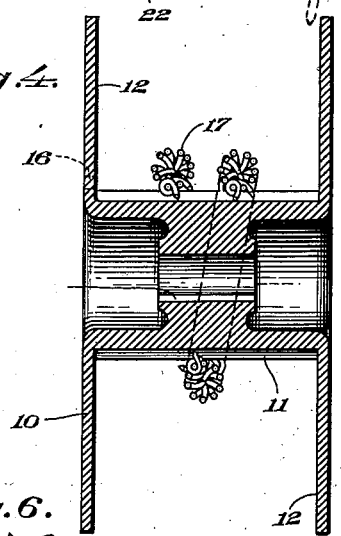
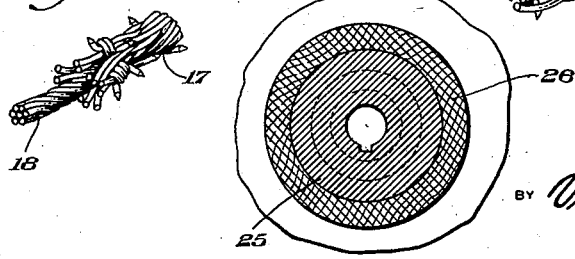
Jay P. Nielson:
INVENTOR

UNITED STATES PATENT OFFICE 2,284,919

HAYSTACK SAW

Jay P. Nielson, San Diego, Calif.

Application March 26, 1941, Serial No. 385,382

5 Claims. (Cl. 146—70)

This invention relates to haystack saws and has for an object to provide a simplified band saw adapted to be looped around a haystack vertically to cut the haystack into sections for baling or transportation purposes, and also so that the hay can be more easily fed to livestock.

A further object is to provide apparatus of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a haystack saw constructed in accordance with the invention, in applied position on a haystack.

Figure 2 is a side elevation of a modified form of the invention in which a block and tackle is used to elongate the loop during the cutting operation.

Figure 3 is a longitudinal sectional view of the power driven pulley of the saw.

Figure 4 is a cross sectional view taken on the line 4—4 of Figure 3 showing a convolution of the band saw engaged on the pulley.

Figure 5 is a modified form of power driven pulley.

Figure 6 is a detail perspective view of a portion of the band saw.

Figure 7 is a detail perspective view of a portion of the band saw reinforced with a wire core.

Referring now to the drawing in which like characters of reference designate similar parts in the various views, the haystack saw comprises a pulley 10, which is provided with ribs 11 on its drum to increase its traction on the band saw. The pulley is provided with rims 12 to prevent the displacement of the band saw from the pulley. The pulley may be formed for application to the power take-off shaft 13 of a tractor 14, or for application to the power take-off pulley of the tractor, and for this purpose is provided with a key way 15 and with openings 16 in one rim. The band saw may be wound on the pulley for storage when not in use.

The band saw 17 is formed of a plurality of strands of barbed wire twisted together, as shown in Figure 6. To increase the strength of the band saw, a wire cable 18 may be twisted between the barbed wires to form a flexible core for the band saw.

In use, the band saw is looped vertically around the haystack and one or more convolutions thereof are wound upon the pulley. Then the ends of the band saw are coupled together in any preferred manner, such as stranding as in forming a rope joint, or by any desired coupling means. The rotation of the pulley imparts belt-like driving movement to the band saw, and during such movement the tractor may be moved away from the haystack to cause the loop to be constricted in vertical diameter to cut the haystack from end to end in a vertical plane.

As shown in Figure 2, a modified form of the invention consists of applying a conventional block and tackle 19 to the loop of the band saw 20 on the opposite side of the haystack from the tractor 21. The band saw passes around the pulley 22 of the block and tackle and around the power driven pulley 23 of the tractor. In this form of the invention, the tractor is stationary while the operator pulls on the cable 24 of the block and tackle to constrict vertical diameter of the loop of the band saw as the cutting operation proceeds.

A modified form of band saw pulley is shown in Figure 5, in which the hub 25 of the pulley is provided with a wood rim 26 in lieu of the ribs 11 of the form of pulley shown in Figure 3. The wood rim will provide sufficient traction for the band saw.

From the above description, it is thought that the construction and operation of the invention will be fully understood without further explanation.

What is claimed is:

1. A haystack saw comprising a pulley, means for rotating the pulley, said pulley having rims on the ends and having a drum forming a traction surface, a band saw formed of a number of strands of barbed wire twisted together adapted to be looped around a haystack in a vertical plane, one or more convolutions of the band saw being adapted to be wound upon the drum of the pulley, means connecting the ends of the band saw together to form an endless loop after application to a haystack, and means for moving the pulley away from the haystack to constrict the vertical diameter of the loop during the cutting operation.

2. The structure as of claim 1 and in which the traction surface of the drum comprises a plurality of ribs.

3. The structure as of claim 1 and in which the traction surface of the drum comprises a wood annulus concentric with the axis of the drum.

4. The structure as of claim 1 and in which the last named means comprises a joint formed by twisting and interfitting the terminals of the band saw together.

5. A haystack saw comprising a power shaft, a pulley fixed to the shaft, an endless loop of stranded barbed wire adapted to be engaged around the haystack in a vertical plane and having one or more convolutions wound on the pulley, a block and tackle connected to the endless loop band saw at the opposite end of the loop from the pulley, means for drawing up and maintaining the block and tackle taut during the cutting operation of the barb wire loop, and means for rotating the power shaft.

JAY P. NIELSON.